INVENTORS
MARTIN B. CAVANAGH
BURTON J. WILSON

BY *Richard C. Reed*

ATTORNEY

United States Patent Office 3,386,858
Patented June 4, 1968

3,386,858
METHOD AND MEANS FOR PRODUCING ELECTRICAL ENERGY UTILIZING A BACTERIAL ORGANISM
Martin B. Cavanagh, Kensington, and Burton J. Wilson, Bethesda, Md., assignors to the United States of America as represented by the Secretary of the Navy
Filed Dec. 26, 1961, Ser. No. 162,297
3 Claims. (Cl. 136—83)

The invention described herein may be manufactured and used by or for the Government of the United States of America for governmental purposes without the payment of any royalties thereon or therefor.

This invention relates to a new method and means for producing electrical energy from an energy-yielding biochemical reaction, and more particularly, to an energy conversion system which produces electricity as a result of the metabolism of a bacterial organism.

Many energy conversion systems that produce electrical energy have been found to be inefficient, costly and unstable when transferred into a sea water environment. Conventional electrical batteries are incompatible with the sea and demonstrate short lifetime capabilities due to rapid deterioration of the active materials as well as in performance. Many other proposed methods for converting or storing electrical energy in the sea are handicapped by excessively high rates of fuel consumption and by the related problem of providing sufficient fuel storage for prolonged, unattended operations at considerable sea depths.

The present invention is particularly applicable to the manufacture of primary cells and batteries wherein benefits will be derived from a relatively simple, inexpensive biochemical method for providing electric power. The present cell or battery structures and their mode of operation are compatible with sea environment, furthermore, they advantageously utilize materials of the sea in a biochemically-induced reaction to provide the necessary electromotive force.

In view of the foregoing, it is an object of the present invention to provide a primary cell or battery that can operate effectively in sea water.

Another object of the invention is to employ a biochemical reaction for producing electrical energy economically and for protracted periods of operation without the need for replenishing any interacting substances.

Another object of the invention is to provide a compact, sea-faring energy converter which is capable of producing sufficient electricity in sea water to operate navigation instruments and underwater sound detection devices.

A further object is to provide a biologically-induced electrochemical cell that employs a bacterial organism to energize the cell and furnish electrical energy to a load in an external circuit.

A still further object of the invention is to provide an electrochemical cell that utilizes the materials of the sea as an inexhaustable source of energy fuel.

With these and other objects in view, the invention comprises a novel electrochemical cell that incorporates therein a particular microorganism capable of inducing biochemical reactions that activate the cell and yield electrical energy. The inclusion of a living bacterial form on the surface of an electrode enables the present cell to operate indefinitely by restoring or renewing the cell action by biochemical means. The invention also comprises the method for providing a sufficient electrical potential by means of novel electrode surfaces in a biochemical energy converter.

The general configuration of the cell includes two or more suitably conducting electrodes immersed in natural or simulated sea water. The electrodes which are of any desired configuration are assembled in spaced relation with alternately arranged positive and negative electrodes; all positive electrodes are connected together to a positive terminal and all negative electrodes are similarly connected to a negative terminal. The negative electrodes are formed of ferrous metal which is coated or inoculated on the surface thereof with carefully selected bacteria, in accordance with the invention, to provide an active electrode surface. The visible evidence of the presence of a microorganism on the ferrous metal is a blackening produced by chemical action as a result of the organism's metabolic reactions in the presence of ferrous metal.

The cell also includes one or more positive electrodes formed of metal, such as a steel composition which is resistant to bacterial transfers from the negative electrodes, the surface of said electrodes becoming continuously coated with a saline deposit during the operation of the cell. For example, the positive electrodes may be formed of a nickel chromium steel or other stainless steel compositions which remain substantially free of bacteria but which become coated during the operation of the cell with a saline deposit, consisting essentially of a firm, dense precipitation of calcium and magnesium compounds. It has been found that a substantial increase in potential can be obtained as a result of the saline deposit on the positive electrodes and that the higher potential improves the possible output of work or free energy of the cell.

In accordance with the present invention, the negative electrode is the site of a bacterium of the genus, Desulfovibrio, an anaerobe characterized by its ability to reduce sulfate ion and produce sulfide. The Desulfovibrio that is employed in the present cell structure is the sea water variety which grows rapidly in water habitats containing 2 to 3 percent salt, and including therein the sulfate ion and some organic nutrient, said variety of bacterium being, furthermore, viable under conditions prevalent in the sea. The marine cultures grow in media containing soluble salts of calcium, magnesium and sodium normally encountered in sea water salinity, at a pH of about 6 to 8, and these marine cultures are sometimes designated as *D. aestuarii*.

Cultures that are utilized for the purposes of the present invention are developed from bacteria found in marine sediments, along shore lines and in estuarian mud; such cultures also include the enzymes and other divers forms with which said organism is normally associated in nature. In the conditions prevalent in the sea, the *D. aestuarii*, along with compatible and related strains, are capable of oxidizing organic nutrient material by reducing equivalent amounts of sulfate ion. The *Desulfovibrio aestuarii* have been included in Bergey's Manual, 7th ed. (1957) among the sulfate-reducing bacteria which grow anaerobically in a medium containing both sulfates and a small amount of organic material.

The bacterial coating may be conveniently formed by inserting a ferrous metal electrode into a prepared culture of bacteria and allowing the metal to remain therein in contact with the bacteria for a period of about 24 hours or until an iron sulfide coating is observed on the metal surface. Clean iron surfaces, free of scales or corrosion are effectively colonized with bacteria to form a thin, active electrode surface permanently affixed to the metal without proliferating or dissolving in the electrolyte during the electrochemical action. Electrodes which are prepared in this manner are inserted into cell or battery structures containing fresh sea water electrolyte. Newly assembled units are supplied with enriched nutrient materials containing sulfate, a commercial vitamin complex, such as Vita-12, also lactate, malate or pyruvate for rapid growth and enumeration of the bacteria.

The cell action is believed to be based on reduction of sulfate by the bacteria involving electron transfer from the iron and from the nutrient products catalyzed by enzymes contained in the bacteria. The sea water electrolyte separates the positive and negative electrodes and acts as an ion conductor. The saline deposit on the positive electrode consists of $CaCO_3$, $MgCO_3$, and $Mg(OH)_2$ due to reaction of calcium and magnesium ions naturally present in sea water, with the carbon dioxide formed in part by bacterial metabolic action and as a product of electrolytic action during cell operation. This carbonate coating on the electrode surface provides a considerable increase in the potential of the cell; the open-circuit voltage may attain values greater than 0.7 volt. These combined reactions result in the voltage observed at the cell terminals.

It is understood of course that the invention is in no way limited by the current explanation concerning the manner in which the cell action is obtained, since it appears that complex reactions occur at the electrode surfaces, within the bacteria and in the electrolyte which cannot be fully explained.

Cells and batteries in accordance with the present invention are well adapted for low current drains and when service is required for an extended length of time. Cells connected to a load of 50,000 ohms can furnish a potential of about 0.65 volt, sufficient to operate navigation aids or devices for detecting enemy submarines.

With the method thus outlined, reference will now be made to the accompanying drawing which illustrates specific embodiments by which the invention may be practised.

Figure 1:
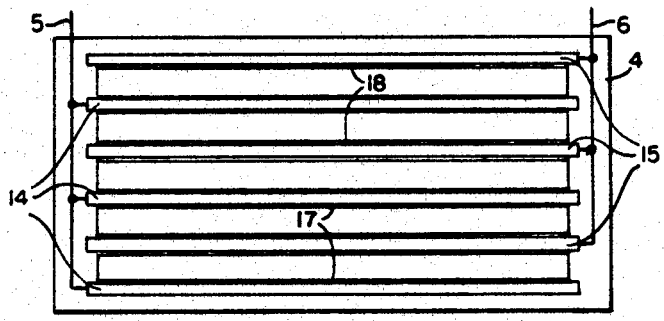
FIG. 1 shows a diagrammatic view of a battery which operates in accordance with the teachings of the present invention.

Referring now to FIG. 1, there is shown diagrammatically a battery structure having an insulated rack or frame 4 adapted to receive a plurality of spaced, parallel ferrous metal plates; the negative plates 14 are shown electrically joined together to a negative lead 5, and positive plates 15 are shown electrically joined together to a positive lead 6. The surface of negative plates 14 are uniformly coated with a bacterial coating comprising the bacteria, *D. aestuarii* and iron sulfide, depicted in the drawing as a heavy line 17. The surface of the positive plates 15 become coated soon after the battery has been assembled and placed into operation with a saline deposit, shown in the drawing as a spaced line 18. The battery plates are submerged in sea water electrolyte (not shown), with suitable provisions for periodic or regular replenishment of the electrolyte as it becomes depleted in nutrient material and contaminated with biological byproducts.

The bacterial coating 17 is obtained by placing clean iron plates into bacterial cultures at room temperature until a dark surface coating is observed. Coated plates are then transferred and inserted into appropriate grooves in the rack or frame 4. The carbonate coating 18 is deposited on plates 15 during the come-up or activation period after the battery has been placed into operation. Alternately, the carbonate coating may be electrolytically deposited on plates 15 in an electrolytic cell by making said plates cathodic and forming the coating at a suitable current density. Preformed carbonate coatings eliminate the need for an activation period in the battery, thus providing uniform and predictable operating values.

Figure 2:
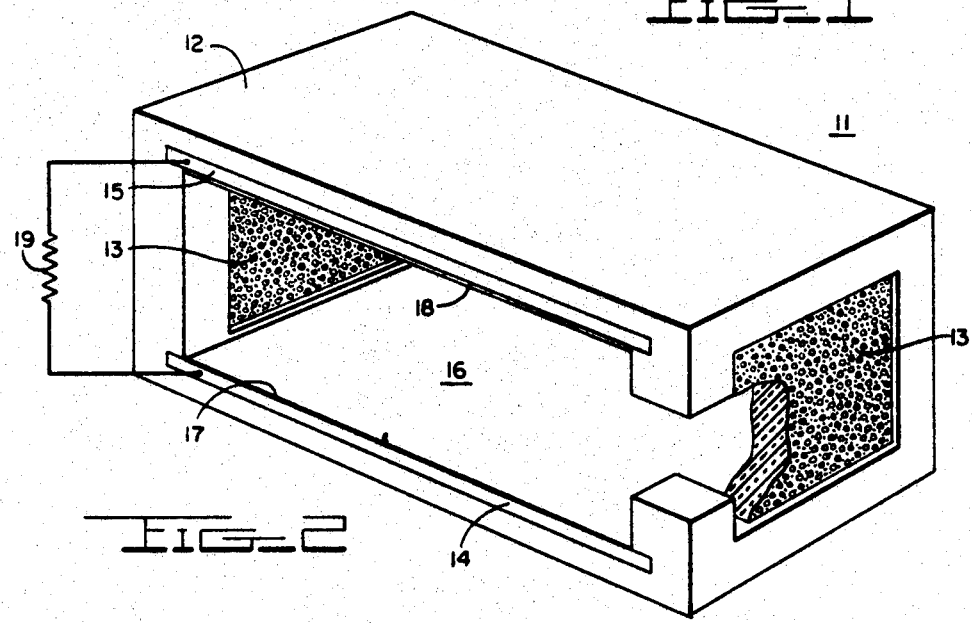
FIG. 2 illustrates an electrochemical cell of the present invention, cut away in part to expose the internal structure.

A simple power unit adapted for use in the ocean is the primary cell 11, shown in FIG. 2, which comprises a sturdy insulated casing 12 formed of such materials as ceramic, hard rubber or plastic compositions; said casing having porous sections 13 that are pervious to the passage of water. The porous sections may be formed of the same composition as the rest of the casing or of other rigid, porous layers which are fitted into openings in the casing wall. As shown in the drawing, the casing may have a removable end section to provide convenient means of assembly. The interior of said casing contains parallel metal plates, shown in the drawing for simplicity as a single negative plate 14 and a single positive plate 15. Said plates are attached to the casing wall to protect unreactive surfaces from sea water corrosion; the ends of the plates are preferably embedded into the casing wall as a further safeguard to the metal.

The negative plate 14 is formed of iron metal which has a bacterial surface 17 consisting of iron sulfide and the bacteria, *D. aestuarii*. The positive plate 15 consists of a nickel chromium steel having a coating 18 of basic calcium and magnesium carbonate. The space 16 between the plates is completely filled with sea water electrolyte. The term "sea water electrolyte" as used in the present specification refers to a solution of inorganic compounds, mainly of calcium sulfate, magnesium sulfate, magnesium chloride and sodium chloride, and also to organic matter, either in solution or in particulate form; said constituents being present in concentrations normally encountered in sea water.

After the cell unit 11 is assembled, it may be connected to a load 19, through an external circuit, and said combination may then be employed as a sea-faring device for prolonged operations in the sea.

Figure 3:
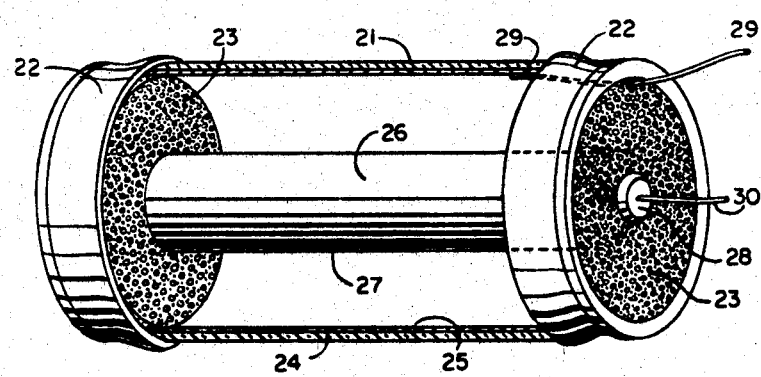
FIG. 3 illustrates another embodiment of a cell structure that can operate indefinitely in the sea.

In the embodiment illustrated in FIG. 3, a cylindrical glass receptacle 21 is capped at both ends thereof with insulator caps 22; said caps have a porous area 23 that permits sea water to pass into and out of the receptacle. An iron sheet 24 is attached to the inner glass surface. A bacterial coating 25 consisting of *D. aestuarii* and iron sulfide is formed on the entire surface of the iron sheet. A rod or cylindrical tubing 26 of stainless steel composition is centered within said receptacle and attached to each of said insulator caps 22 by means of a threaded metallic shank (not shown) having an insulated head 28. A coating 27 is formed on the surface of said rod during the operation of the cell. The cell structure is electrically connected to an external circuit by means of a conductor 29 attached to the iron sheet 24 and brought out through the insulator cap 22 to form the negative lead of the cell, and a wire lead 30 connected to said rod 26 through the threaded shank of insulated head 28 to form the positive lead of the cell. The cell may be directly attached to any signal or warning device, and the cell leads 29 and 30 connected to an appropriate circuit. The combined units may then be tossed into the sea in predetermined areas to operate indefinitely by means of biochemical reactions with organic and inorganic materials of the sea as the sole source of energy fuel.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. A method for potentiating the electrical energy produced by iron electrodes, comprising the steps of;
    coating a first iron electrode with anaerobic Desulfovibrio bacteria,
    placing said first electrode in spaced relationship with a second iron electrode which is substantially free of bacteria,
    submerging said electrodes in media containing soluble salts of calcium, magnesium and sodium, and
    forming an external circuit between said electrodes for a time sufficient to form a saline deposit on the submerged electrode which is substantially free of bacteria, said substantially bacteria free electrode functioning as a cathode to produce substantially increased electrical potential between the electrodes.

2. The method of claim 1 in which said media is sea water.

3. In a battery for operating submerged in sea water of which each cell includes:
- a first iron electrode coated with an anaerobic bacteria *Desulfovibrio aestuarii* in an insulated receptacle; and
- a second iron electrode substantially free of bacteria disposed in spaced relationship with said first bacteria coated electrode;
- said second electrode having a coating of a first and dense saline deposited containing calcium and magnesium.

References Cited

UNITED STATES PATENTS 3,228,799   1/1966   Rohback _____ 136—83

OTHER REFERENCES

Science and Mechanics, August 1961, pages 116–117.

Bergy's Manual of Determinative Bacteriology, seventh edition, 1957, pages 248–249.

World Oil, vol. 127, 1947, pages 35–38, 40 Ad. 41.

Proc. Royal Soc., London (Series B), Biological Papers, vol. 84, March 1912.

Journal of Bacteriology, vol. 121, January–June 1931, pages 18–19.

Business Week, Research, May 6, 1961, page 68.

WINSTON A. DOUGLAS, *Primary Examiner.*

JOHN R. SPECK, ALLEN B. CURTIS, *Examiners.*

H. FEELEY, *Assistant Examiner.*